(No Model.)
R. S. CHANEY.
CULTIVATOR.
No. 532,313. Patented Jan. 8, 1895.
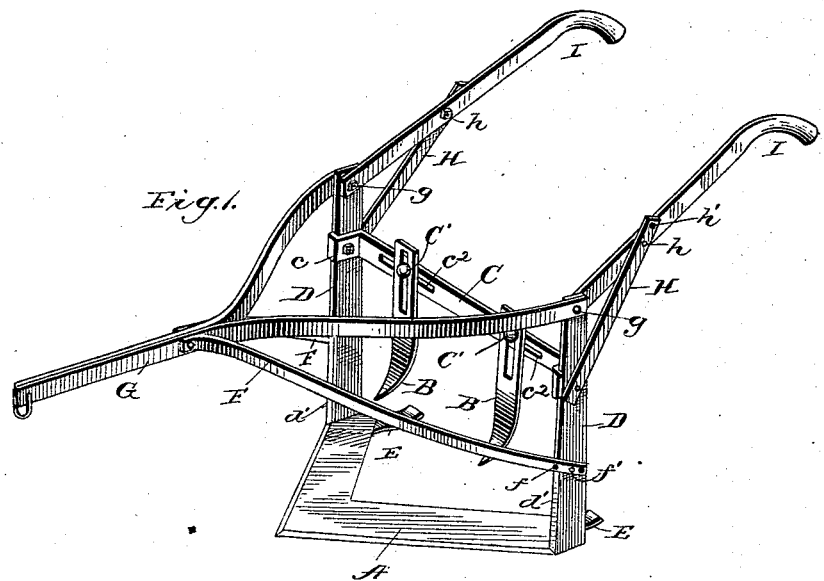
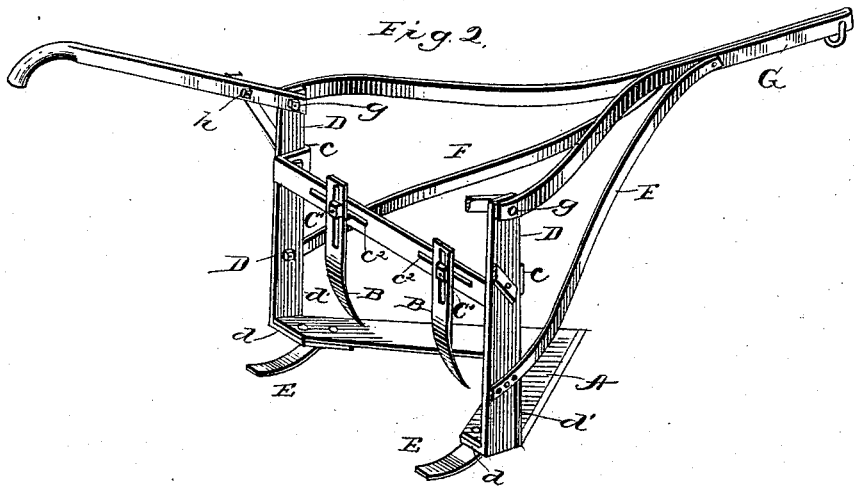
Witnesses:
J. M. Fowler Jr.
Jas. T. O'Neale.
Inventor:
Riley S. Chaney
By A. H. Evans & Co.
Attorneys.

UNITED STATES PATENT OFFICE.

RILEY S. CHANEY, OF PRIERTOWN, OHIO.

CULTIVATOR.

SPECIFICATION forming part of Letters Patent No. 532,313, dated January 8, 1895.

Application filed March 30, 1894. Serial No. 505,660. (No model.)

*To all whom it may concern:*

Be it known that I, RILEY S. CHANEY, a citizen of the United States, residing at Priertown, in the county of Highland and State of Ohio, have invented certain new and useful improvements in Cultivators, of which the following specification contains a full, clear, and exact description, reference being had to the accompanying drawings, in which—

Figures 1, and 2, are respectively front and rear perspectives of the cultivator; one of the handles being broken away in Fig. 2.

This invention relates to combined surface and sub-soil cultivators, for cultivating young or small crops planted or drilled in rows.

The object of the invention is to provide a cultivator of this class which shall be simple in its construction, easily adjusted, and which will loosen the soil under the rows below the roots to permit air and heat to enter and also cultivate the surface of the soil at opposite sides of the rows.

The invention will first be described and then specifically pointed out in the claims.

In the drawings, A, represents the main share or blade of the cultivator, and is formed of a flat V-shaped piece of sheet steel.

D D, are the standards also formed of sheet steel and having their lower ends provided with inwardly extending flanges $d\ d$, which are bolted or riveted to the diverging ends of the share A. The forward edges of the standards D D, are formed as cutting edges as shown at $d'\ d'$ so as to readily pass through the soil.

E, E, are runners bolted or riveted to the diverging ends of the share A, and extending rearwardly therefrom. These runners E, E, regulate the depth at which the share A, is to pass beneath the surface of the ground, and also tend to make the cultivator run smoothly. These runners or shoes are curved downwardly and rearwardly from the rear diverging ends of the share A and hence incline the share forwardly and downwardly toward its front end. The greater the inclination the greater the depth penetrated by the share. By bending these runners E E to a greater or less degree, or by substituting runners of different size the inclination of the share may be changed at pleasure.

G, is the beam also formed of sheet or bar metal, with its rearwardly diverging ends bolted to the upper ends of the standards D, D, by the bolts $g$.

F, F, are braces pivoted at their forward ends to the beam, and provided at their lower rear ends with a series of apertures $f$, through which pass the bolts $f'$ said bolts also passing through the standards D, D. These apertures and bolts provide for the proper adjustment of the braces to raise and lower the forward end of the beam.

C, is a cross bar provided with flanged ends $c$, which are bolted or riveted to the inner faces of the standards D, D, the said flanges being also bent outwardly across the forward edges of the standards to prevent the cross bar from rocking. This cross bar C is provided with longitudinal slots $c^2$ through which pass the bolts C'.

B, B, are the surface cultivator teeth provided with longitudinal slots at their upper ends through which pass the bolts C'. The two sets of slots just described provide for the vertical as well as the lateral adjustment of these cultivator teeth, and if desired, the teeth may also be set at any desired angle.

Instead of the cultivator teeth B, I may attach a rake to the cross bar C.

I, I, are the handles pivotally connected with the upper ends of the standards D, D, and rendered adjustable by means of the braces H, pivoted to the standards, and pivoted to the handles in the usual manner, through the medium of bolts $h$ and apertures $h'$.

In operation the horses will pass between the rows of plants, and draw the cultivator along with its share A, under the plants and below their roots, while the cultivator or rake teeth are cultivating the surface of the soil and removing any weeds or grass growing there.

Having thus described my invention, what I claim, and desire to secure by Letters Patent of the United States, is—

1. A cultivator comprising a beam, standards depending therefrom, a single flat share having rearwardly diverging members secured at their rear ends to said standards, and runners secured to the said rear ends and curved or inclined downwardly and rearwardly therefrom, substantially as herein described.

2. A cultivator consisting in the beam having rearwardly diverging sides, standards depending from the rear ends thereof, a single flat share having rearwardly diverging members secured at their rear ends to the lower ends of the standards, flat sheet metal runners secured to the rear ends of the share and curved or inclined downwardly and rearwardly therefrom, a cross bar above the share and teeth adjustable thereon, substantially as herein described.

RILEY S. CHANEY.

Witnesses:
A. D. WIGGINS,
HENRY L. WIGGINS.

Correction in Letters Patent No. 532,313.

It is hereby certified that the residence of the patentee in Letters Patent No. 532,313, granted January 8, 1895, upon the application of Riley S. Chaney, for an improvement in "Cultivators," was erroneously written and printed "Priertown, Ohio," whereas said residence should have been written and printed *Pricetown, Ohio;* and that the said Letters Patent should be read with this correction therein that the same may conform to the record of the case in the Patent Office.

Signed, countersigned, and sealed this 15th day of January, A. D. 1895.

[SEAL.]

JNO. M. REYNOLDS,
*Assistant Secretary of the Interior.*

Countersigned:
    JOHN S. SEYMOUR,
        *Commissioner of Patents.*